3,071,105
ELECTROLUMINESCENT GAUGE
Harry P. Wertheimer, Evanston, Ill., assignor to Stewart-Warner Corporation, Chicago, Ill., a corporation of Virginia
Filed Aug. 26, 1959, Ser. No. 836,304
5 Claims. (Cl. 116—129)

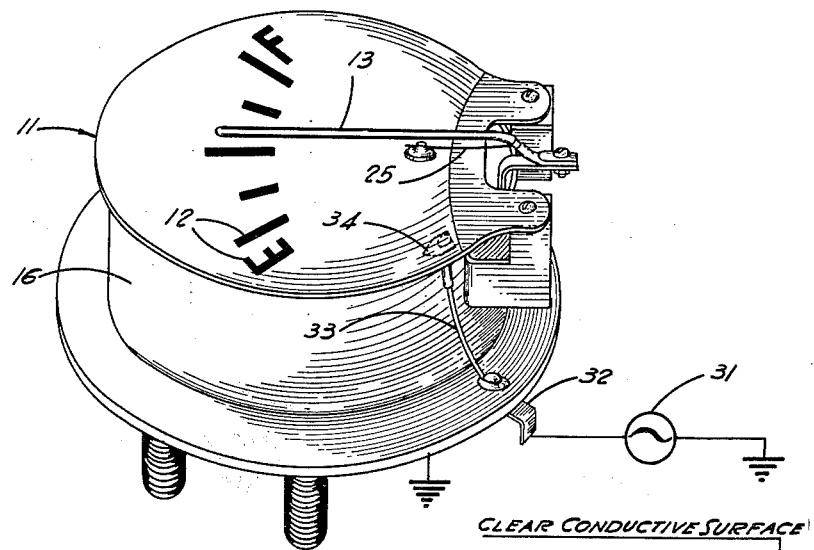
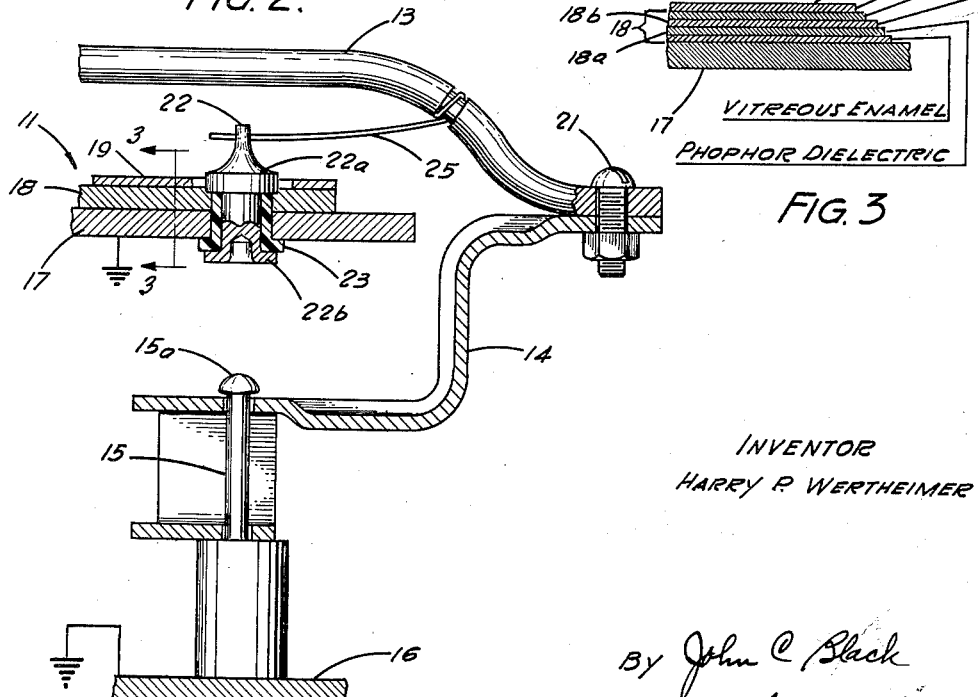

This invention relates to electroluminescent lighting of gauges and more particularly to an improved means for making electrical connections to the dial and moving pointer of the gauge.

In the gauge art which employs electroluminescent lighting, it becomes desirable to cause luminescence of the pointer as well as the dial. This necessitates the provision of at least two electrical circuit connections to the pointer in order to apply a potential across the electroluminescent material carried on the pointer. A serious problem arises in that part of the art in which the torque available for pointer movement is unusually low. Provision of one circuit connection is readily solved since it is common to have the pointer electrically connected to the grounded case of the gauge. However, the provision of a second circuit connection insulated from the ground presents a problem.

It is an object of the present invention to provide in a gauge an improved low friction torque means for making an electrical connection to electroluminescent material on a pointer. In the preferred embodiment, this electrical connection includes a stationary metallic stud and a contact brush on the pointer engaging a small diameter section of the stud. The other electrical connection is provided by grounding the body portion of the pointer. As the brush rotates with the pointer, it maintains reliable electrical contact with the stud to provide one connection.

It is a related object to provide an indicating instrument with an improved low cost circuit construction for making connections to electroluminescent material on the instrument.

Other objects and the various features of the invention will be appreciated upon a perusal of the following description taken in conjunction with the accompanying drawings in which:

FIG. 1 is a perspective view of a representative gauge having electroluminescent lighting which employs this invention;

FIG. 2 is an enlarged, fragmentary, section of the gauge shown in FIG. 1; and

FIG. 3 is an enlarged section of a portion of an electroluminescent buildup as seen from line 3—3 of FIG. 2.

The structure of the present invention includes a gauge having an electroluminescent material on the dial and on the pointer which is movable across the dial. The pointer is pivotally mounted on a post below the dial and carries a brush contact resiliently engaging the periphery of a conductive stud preferably aligned with the post. The stud supplies voltage to the pointer through the contact. Preferably the stud has a flange engaging the upper surface of the electroluminescent buildup of the dial.

The drawings illustrate a gauge of the type which indicates fuel supply. The gauge has a dial 11 provided with an electroluminescent indicia 12. An electroluminescent pointer 13 is fixed to a rigid metal strap or arm 14. The arm is pivotally mounted on a post or arbor 15 fixedly secured to casing 16. A head 15a at the upper end of the post 15 retains the arm 14 on the post. The dial includes a metal base 17 electrically grounded, an electroluminescent lamination buildup or layer 18 and an opaque mask or stencil 19. The layer 18 is of a known type whose construction is indicated by the legends of FIG. 3. The phosphor dielectric 18a of the layer 18 glows when an alternating, pulsating, or otherwise variable source of voltage is applied across conductive surface 18b and the base 17.

The pointer 13 has a metallic body, preferably tubular, with a coating similar to the layer 18 extending from the free end thereof to a position adjacent its connection to the arm 14. The metallic pointer is connected electrically by a screw 21 to the strap 14 which is connected to ground through the post 15 and casing 16. The conductive surface of the pointer corresponding to 18b is electrically insulated from the strap 14 by the phosphor dielectric and the enamel.

A flanged, electroconductive pin or stud 22 is mounted on the dial by flanges 22a and 22b at opposite ends of a dielectric flanged bushing 23. The flange 22a is pressed into close, electroconductive contact with the conductive surface 18b. The pin 22 is axially aligned with the post 15.

A brush contact 25 of silver plated electrical spring contact material is fixed rigidly at one end to the pointer 13 and resiliently engages the periphery of the pin 22 at its other end. The contact is connected electrically to the conductive surface corresponding to 18b of FIG. 3. The contact 25 preferably is of Phosphor bronze. The contact 25 maintains conductive surface of the pointer 13 electrically connected to one terminal of the voltage source.

To supply the desired electrical potential to pointer 13 and dial 11, an A.C. source 31 is connected to a terminal 32 mounted on and insulated from the casing 16. The terminal 32 is connected electrically by insulated conductor 33 to a spade-like contact 34. The contact 34 electrically engages the surface 18b and is insulated electrically from the base 17.

Since the brush contact 25 pivots with the pointer 13 relative to post 15 and the pin 22 is axially aligned with the post, there is very little torque due to friction between contact 25 and pin 22 while excellent electrical contact is provided. This is the result of the very small radius (at the top of pin 22) through which the friction acts. The extremely low friction torque provided by this construction is of the utmost importance for gauges in which the pointer actuating torque is low. Magnetic gauges of the type shown in U.S. Patent No. 2,284,045 generally have a low actuating torque and said patent is hereby specifically incorporated in the present application by way of example.

The silver plating of the contact 25 also contributes to this low friction. The coaxial alignment of the post 15 and the pin 22 assures uniform frictional loading on the pointer in all angular positions thereof.

It should be understood that the above described examples are merely illustrative of the principles of this invention, and that numerous modifications may be devised by those skilled in the art without departing from the scope of the invention.

What is claimed is:

1. In combination, arbor means defining a rotational axis, a pointer mounted pivotally on the arbor means for rotation about said axis, an electroconductive member having a contact surface substantially aligned with the axis, and an electroconductive resilient brush contact having a first end mounted rigidly on the pointer at a point radially spaced from said axis and a second end projecting past said electroconductive member and resiliently slidably engaging said surface.

2. In combination, a cup-shaped gauge casing, an arbor defining an axis on said casing, an arm pivotally mounted on said arbor, a dial base, a flanged pin mounted on the dial base having a contact surface substantially in alignment with said arbor and projecting upwardly from said dial base, means insulating said pin electrically from said dial base and said arbor, a first electroluminescent means on said dial base including an upper electroconductive surface in electrical contact with said pin, a pointer mounted on said arm in a position extending over said electroluminescent means and a second electroluminescent means having an upper electroconductive surface means on said pointer, and a resilient brush contact means having a first end connected to said electroconductive surface on said pointer at a point radially spaced from said axis and a second end in free, resilient contact with the contact surface of said pin to provide a low friction slip connection therewith.

3. In combination, a dial base of electroconductive material, electroluminescent means on said dial base including an electroconductive surface, a stencil mask on said electroluminescent means, said base, electroluminescent means and mask defining a hole therethrough, a bushing of electrical insulating material in the hole, a pin having an upper flange engaging said electroconductive surface and extending through the bushing to project above the mask, said pin having a lower flange engaging the bushing and a contact surface above said upper flange, an arbor defining an axis aligned with the contact surface of the pin, an arm pivotal on the arbor about said axis, a pointer having a body portion carried rigidly by said arm in a position extending over said pin, said pointer including an electroluminescent coating having an electroconductive outer surface, a brush contact carried by the pointer having a first portion in contact with the electroconductive surface on said pointer at a point radially spaced from said axis and having another portion in resilient free engagement with the contact surface of the pin, and means for applying a potential between said dial base and said electroconductive surface on said dial base.

4. In combination, a dial base having an upper face, a first electroluminescent coating including an electroconductive surface on the upper face of the dial base, a pointer having a coating of electroluminescent material, means defining an axis and including an arm mounting said pointer over said dial base coating pivotally about said axis, an electroconductive pin mounted in contact with said electroconductive surface on said dial base and in alignment with said axis, and a spring brush contact rigidly carried by the pointer at a point therein spaced from the axis and positioned for freely and slidably engaging the pin, so that electrical contact is maintained with the pointer while offering little if any pivotal resistance to the pointer about said axis.

5. An electrical contact arrangement for a pointer mounted by means defining an axis for rotation thereabout, comprising an electroconductive member having a contact surface substantially aligned with said rotational axis, and an elongated electroconductive resilient brush contact rigidly secured at one end to said pointer at a point thereon spaced radially from said axis, said brush contact projecting transversely to said axis toward said member and adapted by the resiliency therein to freely and slidably engage said contact surface and maintain reliable electrical contact therebetween.

References Cited in the file of this patent

UNITED STATES PATENTS 2,792,803   Hardesty _____ May 21, 1957